(12) United States Patent
Stoval, III et al.

(10) Patent No.: US 6,747,665 B1
(45) Date of Patent: Jun. 8, 2004

(54) SEMI-TRANSPARENT MEDICAL IMAGE OVERLAYS

(75) Inventors: William M. Stoval, III, Milwaukee, WI (US); Matthew W. Turek, Waukesha, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/307,875

(22) Filed: May 10, 1999

(51) Int. Cl.$^7$ .............................. G09G 5/00; G09G 5/02
(52) U.S. Cl. ...................................... 345/629; 345/592
(58) Field of Search ................................. 345/113, 114, 345/435, 433, 419, 418, 593, 592, 629, 632, 634, 636, 639; 378/98.12

(56) References Cited

U.S. PATENT DOCUMENTS

| | | | | |
|---|---|---|---|---|
| 4,259,725 A | * | 3/1981 | Andrews et al. | 345/856 |
| 4,853,947 A | * | 8/1989 | Haaker et al. | 378/98.12 |
| 4,869,247 A | | 9/1989 | Howard, III et al. | |
| 5,090,411 A | | 2/1992 | Higuchi | |
| 5,341,465 A | * | 8/1994 | Goto | 345/626 |
| 5,831,612 A | * | 11/1998 | Stoval, III et al. | 345/339 |
| 5,872,573 A | * | 2/1999 | Adegeest | 345/621 |
| 5,886,701 A | * | 3/1999 | Chauvin et al. | 345/418 |
| 5,956,180 A | * | 9/1999 | Bass et al. | 345/3 |
| 5,987,345 A | * | 11/1999 | Engelmann et al. | 128/920 |
| 6,008,820 A | * | 12/1999 | Chauvin et al. | 345/502 |
| 6,049,339 A | * | 4/2000 | Schiller et al. | 345/435 |

FOREIGN PATENT DOCUMENTS

| | | |
|---|---|---|
| EP | 0 629 963 A2 | 6/1993 |
| EP | 0 607 000 A2 | 1/1994 |
| EP | 0 817 133 A2 | 1/1998 |

OTHER PUBLICATIONS

Hance et al., "Unsupervised Color Image Segmentation", Feb. 1996, IEEE Engineering in Medicine and Biology Magazine, vol. 15, isse 1, pp. 104–111.*
Soussi et al., "Merging in medical multimodality imaging", 1996, 18th Annual International Conference of the IEEE Engineering in Medicine and Biology Society, vol. 5, pp. 2293–2294.*
Saund et al., "Perceptual Organization in an Interactive Sketch Editing Application", 1995, Xerox Palo Alto Reasearch Center.*
B. Diallo, "*Conception, réalisation et explotation d'une base de donées en neuroimagerie cognitive*", Dec. 2, 1998, These Doctorat De L'Universite De Caen, FR XP002147317 (See copy of International Search Report).
Friets et al., "*A Frameless Stereotaxic Operating Microscope For Neurosurgery*", IEEE Transactions On Biomedical Engineering, US, IEEE Inc. New York, vol. 36, No. 6, Jun. 1, 1989.
Foley et al., "*Computer Graphics. Principles and Practice*", 1990, Addison–Wesley Publishing Company, XP002147318.

* cited by examiner

*Primary Examiner*—Matthew Luu
(74) *Attorney, Agent, or Firm*—Carl B. Horton, Esq.; Armstrong Teasdale LLP

(57) ABSTRACT

The present invention, in one form, is a system for simultaneously displaying an image object generated from an imaging system and a graphical object so that each object is fully visible. More specifically, after generating the image object, a graphical object is generated having a partial opacity value. The image object and graphical object are then sorted and combined so that the graphical object is in front of, or overlays, the image object without blocking or obscuring the information included in the image object. Particularly, a final image is generated by combining a destination value for components of each object.

25 Claims, 1 Drawing Sheet

SEMI-TRANSPARENT MEDICAL IMAGE OVERLAYS

BACKGROUND OF THE INVENTION

This invention relates generally to displaying image information and more particularly, to overlaying graphical objects on medical image object.

In at least one known imaging system shapes, or data, are overlaid on images generated by the imaging system. The shapes define certain areas of interest, such as regions of interest, volumes of interest, shapes used to measure a distance, tick marks, and grids. However, the simultaneous displaying of the medical image and the shapes cause difficulty for an operator of the imaging system attempting to utilize the displayed image and shapes.

More specifically, the solid lines of the shape hides, or covers, a portion of the anatomy displayed in the medical image. This hiding of the anatomy causes significant errors in small measurements and detracts from the quality of the diagnosis. In addition, the solid borders of these shapes may also lead to diagnostic errors when determining statistics. Additionally, when determining an area of the image within a closed shape, it is difficult for the operator to determine whether pixels covered by the shape are counted as part of the area, or whether the shape defines the outside of the area and only the pixels inside contribute towards the area.

It is desirable to provide a system which displays shapes without totally obscuring the medical image. It would also be desirable to provide such a system which fills or outlines the shapes for defining the area covered by the shape.

BRIEF SUMMARY OF THE INVENTION

These and other objects may be attained in a system which, in one embodiment, includes a overlay algorithm that generates graphical objects for display on image objects. More particularly and in one embodiment of the present invention, a medical imaging system generates medical image objects. Graphical objects are then generated, based upon an input from a operator or user, and displayed with the image objects. The graphical objects may be used to measure a distance or select a portion of the medical image. In one embodiment, each graphical object has an opacity value less than the image objects so that when the graphical objects are combined with the image objects, the graphical objects do not obscure any information contained in the image object. More specifically, after sorting the objects in a back to front procedure, a destination value, $C_d$, for each component is determined in accordance with:

$$C_d = \min\left(k_A, Cs*\left(\frac{A_s}{k_A}\right) + C_{d-1}\left(1 - \frac{A_s}{k_A}\right)\right)$$

where:

$A_s$ equals an alpha value for a source; and $k_A = 2^{mc-1}$, where Mc equals a number of bitplanes in an alpha component and $k_A$ is between zero and one.

Cd−1 is a previous destination value of a single component of the image object;

Cs is a source value of a single component of the graphical object; and

Cs and $C_{d-1}$ are from the same component as $C_d$.

A final image is generated, or rendered, utilizing a destination value for each component of each pixel of the combined objects. More specifically, for each pixel of the final image, a destination value is determined for a plurality of components. Particularly, the final image is generated from a red component, a green component, a blue component and an alpha component of each object. The final image is then rendered, or displayed, on a display for use by the physician or operator.

In use, the operator generates a graphical object to define a portion of the image object, for example, a region of interest. The system then combines the objects. As a result of the manner in which the objects are combined, the graphical image does not obscure the image object information. In one embodiment, the system alters the display characteristics of the graphical objects, by outlining or filling the graphical objects, so that the area covered by the graphical area is easily detected by the operator.

The above described overlay algorithm allows a physician or operator to select and display a defined graphical object, along with an image object generated by the imaging system, without the graphical object blocking or obscuring the object image. More specifically, each graphical object and image object are simultaneously displayed so that each object is fully visible. In addition, the described system defines the area covered by the graphical images by filling or outlining the graphical objects.

DETAILED DESCRIPTION OF THE INVENTION

Figure 1:
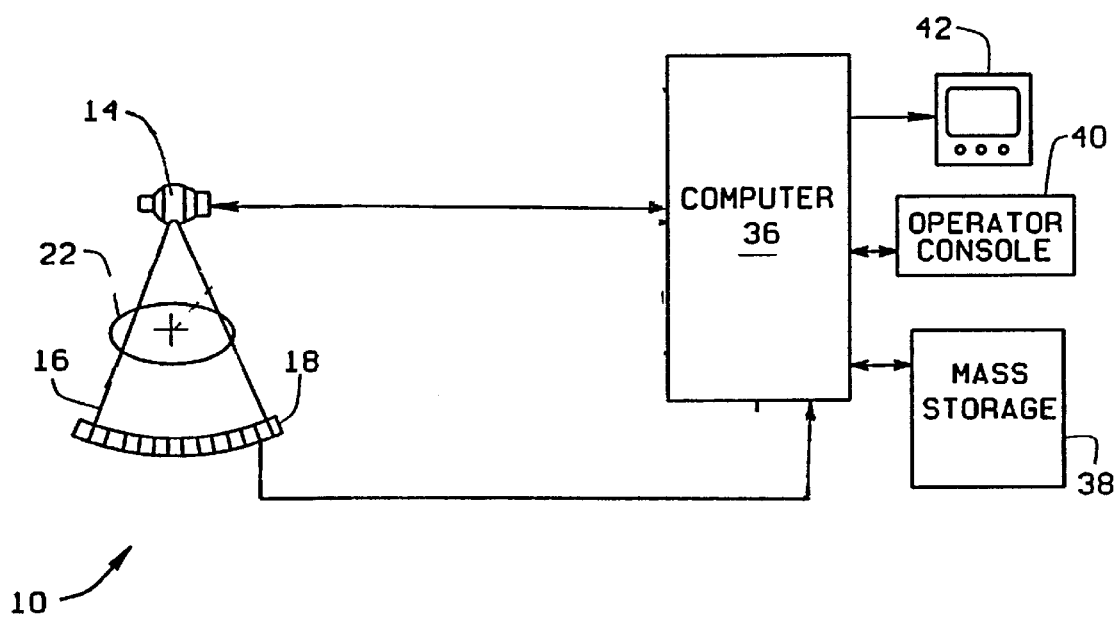
FIG. 1 is a block diagram of an imaging system.

Referring to FIG. 1, an imaging system 10 is shown as including a source 14 that emits energy, for example x-rays 16, toward a detector 18. During a scan to generate at least one image of at least a portion of a patient 22, the energy emitted from source 14 travels through patient 22 and is received by detector 18. In one embodiment, data collected by detector 18 is utilized to generate a reconstructed image (not shown). The reconstructed image is applied as an input to a computer 36 which stores the image in a mass storage device,38. In one embodiment, imaging system 10 generates medical images or medical image objects.

Computer 36 also receives commands and scanning parameters from an operator via console 40 that has at least one input device (not shown), for example, a keyboard or a mouse. An associated cathode ray tube display 42 allows the operator to observe the reconstructed medical image and other data from computer 36. The operator supplied commands and parameters are used by computer 36 to provide control signals and information to source 14 and detector 18.

In accordance with one embodiment of the present invention, an overlay algorithm generates at least one graphical object (not shown) for display on image objects (not shown) generated by imaging system 10. The present overlay algorithm generates one, two, or three dimensional graphical objects which are displayed in combination with the image objects. In one embodiment, the overlay algorithm is implemented in computer 36 and processes, for example, data stored in mass storage device 38.

In one embodiment of the present invention, imaging system 10 generates at least one medical images, or medical image object, as known in the art. For example, in at least one known x-ray system, x-rays 16 are emitted from source 14 through a patient 22 toward detector 18. Utilizing data collected from detector 18, computer 36 reconstructs an image object of at least a portion of patient 22. After generating each image object, each image object is displayed, for example on display 42.

In one embodiment, to further examine, or identify, a specific area of the image object, a physician or technician generates at least one graphical object to visually overlay onto the image object. The graphical object may be utilized to highlight an object of interest and a volume of interest. In one embodiment, the physician selects a specific area, for example, by defining a shape, e.g., a polygon, to identify a region of interest in the object image. For example, the physician may select the specific area utilizing the mouse. System 10, specifically computer 36, then generates a one, two or three dimensional graphical object defining the selected area. More specifically, system 10 places the graphical object over an object of interest in the image object. Particularly, system 10 positions the graphical image relative to the object image so that the area selected by the physician is defined, or identified, by the graphical object. In alternative embodiments, the graphical object may also be utilized to measure, or determine, a distance, add tick marks or gridlines to the object image.

Each object image and each graphical object are then combined and displayed on display 42. In one embodiment, prior to combining the objects, the objects are sorted in a front to back manner. More specifically, each object image is defined as a destination and each graphical object is defined as a source. The objects are then sorted so that each object image, or destination, is moved to a back position and each graphical object is moved to a front position. In order to prevent a graphical object from blocking, or obscuring, any portion of an image object, as a result of the graphical object being positioned in front of the images object, an opacity value is determined for each graphical object. More specifically, each graphical object has an opacity value within a range from zero, where the graphical object completely transparent, to one, where the graphical object is completely obscures, or blocks the image object. In one embodiment, a graphical object has an opacity value approximately equal to 0.25 so that each object image and each graphical object is fully visible.

By combining the sorted image object and graphical objects, a composite image is generated. Specifically and in one embodiment, the composite image is generated by blending each image object and each graphical object. More specifically, the blending of each image object and each graphical object includes determining a source scale factor and determining a destination scale factor. In one embodiment, the source scale factor, $S_c$, is determined in accordance with:

$$S_c = \frac{A_s}{k_A}, \qquad (1)$$

and the destination scale factor, $d_c$, is determined in accordance with:

$$d_c = 1 - \frac{A_s}{k_A}, \qquad (2)$$

where:
  $A_s$ equals an alpha value for a source; and
  $k_A = 2^{mc-1}$, where Mc equals a number of bitplanes in an alpha component and $k_A$ is between zero and one.

In one embodiment, after determining the source scale and destination scale factors, a destination value is determined for a component. Specifically and in one embodiment, a destination value for each component, $C_d$, is determined in accordance with:

$$C_d = \min(k_c, C_s * S_c + C_{d-1} * d_c), \qquad (3)$$

where:
  Cd−1 is a previous destination value of a single component of the image object;
  Cs is a source value of a single component of the graphical object;
  $A_s$ equals an alpha value for a source;
  $k_A = 2^{mc-1}$, where $M_c$ equals a number of bitplanes in an alpha component; and
  the determined $C_d$ is for the same component as $C_s$ and $C_{d-1}$.

Substituting equations (1) and (2) into equation (3), a destination value, $C_d$, is determined in accordance with:

$$C_d = \min\left(k_A, Cs * \left(\frac{A_s}{k_A}\right) + C_{d-1}\left(1 - \frac{A_s}{k_A}\right)\right)$$

where:
  Cd−1 is a previous destination value of a single component of the image object;
  Cs is a source value of a single component of the graphical object; and
  Cs and $C_{d-1}$ are from the same component as $C_d$.

A final image is generated, or rendered, utilizing a destination value for each component of each pixel of the combined objects. More specifically, for each pixel of the final image, a destination value is determined for a plurality of components. More particularly and in one embodiment, the final image is generated from a red component, a green component, a blue component and an alpha component of each object. The final image is then rendered, or displayed, on display 42 for use by the physician or operator of system 10. In one embodiment, where each image object has an opacity value of one and each graphical object has an opacity value of less than one, the overlapping graphical objects do not block the anatomy of the image object. As a result, the operator is able to easily view the anatomy information. In addition and in one embodiment, display characteristics of each graphical object may be slightly altered to identify the area identified by the graphical object. More specifically and in one embodiment, each image object is displayed in a first color and each graphical object is displayed in a different, or second color. In other embodiments, each object may be displayed using a different color or by using the same color to display all of the objects.

In one embodiment, at least one graphical image is filled. More specifically, the filling of each graphical shape allows the operator or physician to easily determine what portion of the image object that is being referred to by the shape, or graphical object. In one embodiment, only an outline, or border of the geographical shape is filled with a selected color. As a result, the only visible part of the shape is the semi-transparent border using the selected color. In another embodiment, the entire geographical shape, for example a polygon, is filled with a selected semi-transparent color.

The above described overlay algorithm allows a physician or operator to select and display a defined graphical image along with an image object generated by the imaging system, without the graphical object blocking or obscuring the object image. More specifically, each graphical object and image object are simultaneously displayed so that each object is fully visible.

While the invention has been described in terms of various specific embodiments, those skilled in the art will recognize that the invention can be practiced with modification within the spirit and scope of the claims. For example, the overlay algorithm may be used many different types or modalities of imaging systems, e.g., MR, CT, x-ray, and mammography.

What is claimed is:

1. A method of displaying objects on medical images generated by an imaging system, said method comprising the steps of:

generating at least one medical image object using the imaging system;

receiving data from a user regarding a selection of an area of the generated medical image;

generating at least one graphical object based on the received data, each graphical object having a determined opacity value; and sorting the objects, and generating a composite image of the objects, wherein said generating a composite image of the objects comprises the step of blending of each image object and each graphical object, wherein said blending each image object and each graphical object comprises the steps of:
determining a source scale factor; and
determining a destination scale factor for a component $C_d$, in accordance with:

$$C_d = \min\left(k_A,\ Cs * \left(\frac{A_s}{k_A}\right) + C_{d-1}\left(1 - \frac{A_s}{k_A}\right)\right),$$

where:

$A_s$ equals an alpha value for a source;

$k_A$ equals $2^{M_c-1}$, where $M_c$ equals a number of bitplanes in an alpha component;

$C_s$ is a source value of a single component of the graphical object; and $C_s$ and $C_{d-1}$ are from the same component as $C_d$.

2. A method in accordance with claim 1 wherein sorting the objects comprises the step of sorting the objects in a back to front order.

3. A method in accordance with claim 1 wherein the source scale factor, $S_c$, is determined in accordance with:

$$S_c = \frac{A_s}{k_A},$$

where:

$A_s$ equals an alpha value for a source; and $k_A$ equals $2^{M_c-1}$, where Mc equals a number of bitplanes in an alpha component.

4. A method in accordance with claim 3 wherein the destination scale factor, $d_c$, is determined in accordance with:

$$d_c = 1 - \frac{A_s}{k_A}$$

where:

$A_s$ equals an alpha value for a source; and $k_A$ equals $2^{M_c-1}$, where Mc equals a number of bitplanes in an alpha component.

5. A method in accordance with claim 4 wherein a destination value, $C_d$, is determined in accordance with:

$$C_d = \min(k_c,\ C_s * S_c + C_{d-1} * d_c)$$

where:

$C_{d-1}$ is a previous destination value of a single component of the image object;

$C_s$ is a source value of a single component of the graphical object; and $C_s$ and $C_{d-1}$ are from the same component as $C_d$.

6. A method in accordance with claim 1 wherein generating at least one graphical object comprises the step of generating at least one shape.

7. A method in accordance with claim 6 wherein generating at least one shape comprises the step of generating at least one polygon.

8. A method in accordance with claim 1 wherein generating at least one graphical object comprises the step of positioning the graphical object relative to the image object.

9. A method in accordance with claim 8 wherein positioning the graphical object relative to the image object comprises the step of placing the graphical object over an object of interest in the image object.

10. A method in accordance with claim 8 wherein combining each image object and each graphical image comprises the steps of:

generating a final image using each image object and each graphical object; and displaying the final image.

11. A method in accordance with claim 10 wherein displaying the final image comprises the steps of:

displaying each image object in a first color; and displaying each graphical object in a second color, where the first color is different than the second color.

12. A method in accordance with claim 10 wherein displaying the final image comprises the step of filling at least one graphical object.

13. A method in accordance with claim 1 wherein a determined opacity value is greater than zero and less than one.

14. A method in accordance with claim 1 wherein a determined opacity value is approximately equal to 0.25.

15. A computer system for displaying objects generated by a medical imaging system, the medical imaging system configured to generate at least one image object, said computer system configured to:

receive data from a user regarding a selection of an area of the generated medical image;

generate at least one graphical object based on the received data, each graphical object having a determined opacity value, and sort the objects; and generate a composite image of the objects, wherein to generate a composite image of the objects, said computer further configured to blend each image object and each graphical object, wherein to blend each image object and each graphical object, said computer further configured to:

determine a source scale factor; and
determine a destination scale factor for a component $C_d$, in accordance with:

$$C_d = \min\left(k_A,\ Cs*\left(\frac{A_s}{k_A}\right)+C_{d-1}\left(1-\frac{A_s}{k_A}\right)\right),$$

where:
$A_s$ equals an alpha value for a source;
$k_A$ equals $2^{M_c-1}$, where $M_c$ equals a number of bitplanes in an alpha component;
$C_s$ is a source value of a single component of the graphical object; and
$C_s$ and $C_{d-1}$ are from the same component as $C_d$.

16. A computer system in accordance with claim 15 wherein to generate at least one graphical object, said computer system configured to generate at least one shape.

17. A computer system in accordance with claim 16 wherein to generate at least one shape, said computer system configured to generate at least one polygon.

18. A computer system in accordance with claim 15 wherein to generate at least one graphical object, said computer system configured to position each graphical object relative to the image object.

19. A computer system in accordance with claim 18 wherein to position each graphical object relative to the image object, said computer system configured to place each graphical object over an object of interest in an image object.

20. A computer system in accordance with claim 18 wherein to combine each image object and each graphical image, said computer system configured to:
generate a final image using each image object and each graphical object; and
display the final image.

21. A computer system in accordance with claim 20 wherein to display the final image, said computer system configured to:
display each image object in a first color, and
display each graphical object in a second color, where the first color is different than the second color.

22. A computer system in accordance with claim 20 wherein to display the final image, said computer system configured to fill at least one graphical object.

23. An imaging system for generating medical images, said imaging system comprising a computer, said computer programmed to:
generate at least one image object, each said image object comprising a medical image;
receive data from a user regarding a selection of an area of the generated medical image;
generate at least one graphical object based on the received data, each said graphical object having a determined opacity value; and
sort the objects in a back to front order; and
generate a composite image of the objects, wherein to generate a composite image of the objects, said computer further configured to blend each image object and each graphical object, wherein to blend each image object and each graphical object, said computer further configured to:
determine a source scale factor; and
determine a destination scale factor for a component $C_d$, in accordance with:

$$C_d = \min\left(k_A,\ Cs*\left(\frac{A_s}{k_A}\right)+C_{d-1}\left(1-\frac{A_s}{k_A}\right)\right),$$

where:
$A_s$ equals an alpha value for a source;
$k_A$ equals $2^{M_c-1}$, where $M_c$ equals a number of bitplanes in an alpha component;
$C_s$ is a source value of a single component of the graphical object, and
$C_s$ and $C_{d-1}$ are from the same component as $C_d$.

24. An imaging system in accordance with claim 23 wherein to generate at least one said graphical object, said computer programmed to generate at least one shape.

25. An imaging system in accordance with claim 23 wherein to generate at least one said graphical object, said computer programed to position each said graphical object relative to each said image object.

* * * * *

UNITED STATES PATENT AND TRADEMARK OFFICE
CERTIFICATE OF CORRECTION

PATENT NO. : 6,747,665 B1 Page 1 of 1
DATED : June 8, 2004
INVENTOR(S) : Stovall, III et al.

It is certified that error appears in the above-identified patent and that said Letters Patent is hereby corrected as shown below:

Column 8,
Line 39, delete "programed" and insert -- programmed --.

Signed and Sealed this

Twenty-third Day of May, 2006

JON W. DUDAS
*Director of the United States Patent and Trademark Office*